4,488,743

United States Patent [19]
Schülke

[11] Patent Number: 4,488,743
[45] Date of Patent: Dec. 18, 1984

[54] FLANGE CONNECTION FOR QUARTZ TUBES

[75] Inventor: Karl A. Schülke, Neuberg, Fed. Rep. of Germany

[73] Assignee: Heraeus Quarzschmelze GmbH, Hanau, Fed. Rep. of Germany

[21] Appl. No.: 401,920

[22] Filed: Jul. 26, 1982

[30] Foreign Application Priority Data

Aug. 3, 1981 [DE] Fed. Rep. of Germany ....... 3130680

[51] Int. Cl.$^3$ ............................................. F16L 17/06
[52] U.S. Cl. .................................... 285/368; 285/414; 285/415; 285/DIG. 12
[58] Field of Search ............... 285/DIG. 12, 368, 413, 285/414, 415

[56] References Cited

U.S. PATENT DOCUMENTS 3,414,297  12/1968  Pollia ............................. 285/415 X
3,966,234  6/1976  Sundholm ....................... 285/415 X

FOREIGN PATENT DOCUMENTS 2459661  1/1976  Fed. Rep. of Germany ... 285/DIG. 12
834853  5/1960  United Kingdom ....... 285/DIG. 12
1143522  2/1969  United Kingdom ................ 285/368

OTHER PUBLICATIONS

Prospectus Q-C 1/112, 1974 by Heraeus Quarzschmelze GmbH.

*Primary Examiner*—Dave W. Arola
*Attorney, Agent, or Firm*—Frishauf, Holtz, Goodman & Woodward

[57] ABSTRACT

To connect together tubular elements, such as pipes and the like, made of materials which are difficult to machine and handle, and which are expensive, such as quartz glass, or quartz materials or quartz-ceramic goods used, for example, in laboratory or chemical processing apparatus, the end portions of the tubular elements are formed with a circumferential groove or recess in which a spring ring made of metal, fiber-reinforced plastic, or the like, is snapped, the spring ring (3) being clamped at its external, projecting surface by a conical surface (8) on a flange ring (4) and a similar conical surface (8) on a counter ring, the flange ring and the counter ring being clamped by connecting bolts (6); two such elements can be connected together by passing connecting bolts (10) through aligned openings (7) in the flange rings; preferably, the connecting bolts are spring-loaded (11). The engagement angles of the conical surfaces (8) on the rings are, for example, about 38° each with respect to a plane passing transversely through the axis of the tubular quartz goods.

20 Claims, 1 Drawing Figure

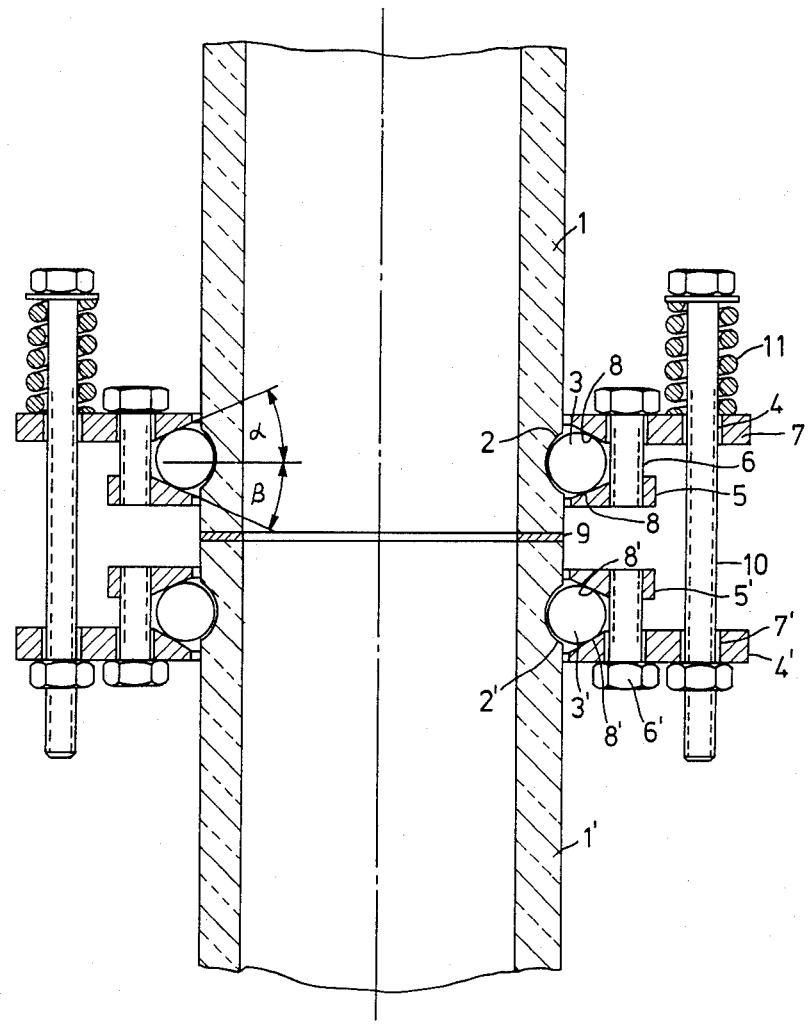

FLANGE CONNECTION FOR QUARTZ TUBES

The present invention relates to a flange connection to connect tubes of quartz glass or other quartz structural elements together, and more particularly to a universally useful flange connection which can be applied to tubes, pipes, and the like, of quartz glass or quartz materials regardless of size.

BACKGROUND

Tubular elements made of quartz glass or of quartz-ceramic materials are used in many applications, particularly in laboratories, and as components in various types of chemical and other apparatus. To connect tubes and pipes of such material together by flange connection causes difficulties since the material is brittle and difficult to shape. It has been proposed to connect tubular elements of quartz-type material together by forming flanges on the pipes or tubes to be connected, interposing a compressible sealing ring between the elements, and clamping the flanges to each other by means of external clamping rings, which surround the pipes or tubes. The flange may be formed as an externally projecting ring, or as a conical enlargement in the region of the flange connection. Such flange connections are illustrated, for example, in the prospectus Q-C 1/112, 1974, issued by Heraeus Quarzschmelze GmbH. The tubular element, during manufacture, has the ring-shaped flange thickening or projection formed thereon, the thickening projections then retaining the metal clamping flange which is placed thereabout. The flange projection itself can be made as desired in conical form, as a ring-shaped projection having an essentially rectangular cross section, or in other forms.

It has been found in operation that connecting tubes or pipes of quartz-type material by means of a projecting flange causes difficulties if the pipe has an inner diameter exceeding about 18 inches (45 cm), and having a wall thickness in excess of about ⅜ inch (15 mm).

THE INVENTION

It is an object to provide a flange connection suitable for quartz-type pipes, tubes, or the like, which is universally applicable regardless of diameter of the pipe or tubular element.

Briefly, the end portion of the pipe or tubular element is formed with a circumferential groove or recess. A spring wire, preferably of circular cross section, is snapped into the groove or recess, the wire fitting into the groove or recess only over a portion of its cross section, the remaining portion projecting therefrom. The remaining portion of the wire is clamped between a flange ring having an external flange with openings therethrough suitable for attachment to an external structure, and a counter or clamping ring, which is located at the side of the spring ring opposite the flange ring. The counter ring and the flange ring are connected by bolts to clamp the spring ring therebetween, the spring ring being held on the tubular element by its seat in the circumferential groove.

Two quartz elements can be connected together by using similar flange rings and clamping rings, and connecting the flange rings by bolts, preferably by spring-loaded bolts.

DRAWING

The single FIGURE is an axial cross section through two quartz pipes, connected together in accordance with the present invention.

The invention will be illustrated using as an example a butt connection of two pipes, in which one of the connections will be described in detail; the other is identical, and similar parts have been given the same reference numerals, with prime notations. A single explanation, therefore, suffices.

A pipe 1 is formed with a circumferential groove or recess 2. A spring ring 3 of essentially circular cross section is snapped into the recess 2. The spring ring, for example, is a split ring made of spring steel, nickel steel spring wire, or the like. The groove is of such thickness that the ring 3 fits into it with only a minor portion of its circumference, preferably less than half the diameter of ring 3—see the FIGURE. A flange ring 4 engages the projecting portion of the spring ring 3 on one side thereof; a counter ring 5 engages the projecting portion of the spring ring 3 at the other side thereof. The flange ring 4 and the counter ring 5 are clamped together by clamping bolts 6, located circumferentially around the connection at suitable distances from each other, for example placed uniformly around a circular pipe every 20°, 30° or 60°, in dependence on the diameter of the pipe. The flange ring 4 and the counter ring 5 are axially clamped together, thus securely holding the spring ring 3 in the groove. The flange ring 4 as well as the counter ring 5 are formed with respective conical engagement surfaces 8 engaging the projecting portion of the spring ring 3 beyond a diametrical line parallel to the pipe 1 and exerting radially inwardly directed pressure on ring 3. The conical engagement surfaces 8 permit floating assembly, and adjustment independent of variations and tolerances of the outer diameter of the pipe 1 so that, upon tightening of the screws 6, uniform engagement pressure of the ring 3 within the groove 2 will be obtained. The inner clearance openings of the rings 4 and 5 is slightly larger than the maximum diameter of the pipe 1 to be expected, in the light of tolerances.

To connect two pipes together, two identical connections are placed on the respective pipe ends 1, 1', a sealing element of an elastic material 9 is placed between the butted ends of the pipes 1, 1', and the flange rings 4, 4' are connected by circumferentially positioned bolts 10, preferably spring-loaded by compression springs 11 to provide for resilient, but tight and secure engagement.

The rings 4, 5 can be made of any suitable metal, or may be made of a plastic material, reinforced by glass fibers. The spring rings 3 need not be made of metal; they may also be made in the form of cup springs or spring washers of resilient material which can be snapped into the circumferential recesses or grooves 3.

Before assembly, the rings 4, 5 as well as the rings 4', 5', of course, fit loosely around the respective pipes 1, 1'. The conical surfaces 8 are so arranged that the divergent surfaces on the rings 4, 5 face the respective pipe 1, 1'; thus, the side of the flange ring 4 which faces the counter ring 5 has a cross-sectional area adjacent the pipe 1 which is substantially less than the cross-sectional area remote therefrom; the counter ring 5, likewise, has a cross-sectional area adjacent the pipe 1 which is less than that remote therefrom. Preferably, the cone angle $\alpha$ of the flange ring 4, 4', is equal to the cone angle $\beta$ of the counter ring 5, 5'. The dimensions of the flange rings and of the counter rings are so selected that the cross section, in the region of the screw connection by the bolts 6, is a maximum. The angles α and β are not critical; preferably, however, the angles are about 38°.

To connect two pipes 1, 1' together, the bores 7, 7' for bolts 10 preferably are slightly larger than the outer diameters of the bolts 10, and the bolts are tightened by compression of spring 11 by a nut secured thereto.

The arrangement has the advantage that tubular bodies of any desired diameter of quartz material, for example, can be connected without the requirement of forming a thickened region to make a flange which uses material difficult to handle and which is expensive. The flange can be easily and quickly connected on any tubular element. Tolerances of the outer diameter of the tubular element are readily accomodated, and a single size of flange ring 4, 4', and counter or clamping ring 5, 5' can be used regardless of tolerance variations of the pipes themselves.

To permit attachment of rings 4, 5, the rings themselves can be split radially and connected together by radially projecting connecting lugs, as well known.

The surfaces on the flange rings 4, 4' and on the counter rings 5, 5' which are remote from the respective opposite ring are, preferably, plane and flat to provide bearing surfaces for the connecting screws 6, and for the nuts and bolts, or springs, respectively, of the connecting bolts 10 and spring 11.

I claim:

1. Flange connection for a tubular element (1) which comprises quartz material, comprising
    an essentially circumferential recess or ring groove (2) formed in the tubular element;
    a spring ring (3) retained in the recess or ring groove having a minor portion of its cross section located in the groove and a remaining and major portion projecting therefrom;
    a flange ring (4) surrounding the tubular element, with clearance, and having an essentially conical surface (8) in engagement with part of said remaining and major projecting portion of the spring ring at one side thereof;
    a counter ring (5) surrounding the tubular element, with clearance, and having an essentially conical surface (8) in engagement with part of said remaining and major projecting portion, and located opposite said one side of the projecting portion of the spring ring;
    and clamping means (6) located beyond said projecting portion and clamping said flange ring and said counter ring onto the spring ring, with the remaining and major portion of the spring ring positioned between the flange ring and the counter ring, while securely holding the spring ring in said circumferential recess or ring groove (2) in the tubular element (1) and compressing the spring ring (3) radially inwardly.

2. Flange connection according to claim 1, wherein the side of the flange ring remote from the counter ring forms a flat surface, and the flange ring has a cross-sectional shape such that the cross section adjacent the tubular element (1) is smaller than the cross section remote from the tubular element, conically increasing and forming said conical surface, linearly increasing by a cone angle α to the final cross-sectional dimension; said final cross-sectional dimension being a maximum in the zone of engagement of said clamping means.

3. Flange connection according to claim 2, wherein the spring ring is of essentially circular cross section.

4. Flange connection according to claim 2, wherein the side of the counter ring (5) remote from said flange ring (4) forms a flat surface, and the counter ring has a cross-sectional shape such that the cross section adjacent the tubular element (1) is smaller than the cross section remote from the tubular element, conically increasing and forming said conical surface (8), linearly increasing by a cone angle β to the final cross-sectional dimension, said final cross-sectional dimension being a maximum in the zone of engagement of said clamping means (6).

5. Flanged connection connecting two tubular elements (1, 1'),
    wherein each tubular element includes a flange connection according to claim 4,
    said tubular elements being positioned in butted alignment, and further including a resilient sealing ring (9) between the butted ends of the tubular elements;
    connecting attachment openings formed in the flange ring (4, 4') of each tubular element, and in axial alignment;
    and spring-loaded connecting bolts (10, 11) extending through said aligned openings, connecting the flange rings (4, 4') and securing together the flange rings (4, 4') secured to each one of the tubular elements (1, 1').

6. Flange connection according to claim 4, wherein the spring ring is of essentially circular cross section.

7. Flanged connection connecting two tubular elements (1, 1'),
    wherein each tubular element includes a flange connection according to claim 6,
    said tubular elements being positioned in butted alignment, and further including a resilient sealing ring (9) between the butted ends of the tubular elements;
    connecting attachment openings formed in the flange ring (4, 4') of each tubular element, and in axial alignment;
    and spring-loaded connecting bolts (10, 11) extending through said aligned openings, connecting the flange rings (4, 4') and securing together the flange rings (4, 4') secured to each one of the tubular elements (1, 1').

8. Flange connection according to claim 1, wherein the side of the counter ring (5) remote from said flange ring (4) forms a flat surface, and the counter ring has a cross-sectional shape such that the cross section adjacent the tubular element (1) is smaller than the cross section remote from the tubular element, conically increasing and forming said conical surface (8), linearly increasing by a cone angle β to the final cross-sectional dimension, said final cross-sectional dimension being a maximum in the zone of engagement of said clamping means (6).

9. Flange connection according to claim 8, wherein said cone angle is in the order of about 38°.

10. Flange connection according to claim 8, wherein the spring ring is of essentially circular cross section.

11. Flange connection according to claim 1, wherein the conical surfaces of the flange ring (4) and of the counter ring (5) are equal.

12. Flange connection according to claim 1, wherein said clamping means (6) comprise connecting screws or bolts.

13. Flange connection according to claim 1, further including connecting attachment openings (7) formed in the flange ring (4).

14. A flanged connection connecting two tubular elements (1, 1'),
   wherein each tubular element includes a flange connection according to claim 1,
   said tubular elements being positioned in butted alignment, and further including a resilient sealing ring (9) between the butted ends of the tubular elements;
   connecting attachment openings formed in the flange ring (4, 4') of each tubular element, and in axial alignment;
   and spring-loaded connecting bolts (10, 11) extending through said aligned openings, connecting the flange rings (4, 4') and securing together the flange rings (4, 4') secured to each one of the tubular elements (1, 1').

15. Flange connection according to claim 1, wherein the spring ring is of essentially circular cross section.

16. Flanged connection connecting two tubular elements (1, 1'),
   wherein each tubular element includes a flange connection according to claim 15,
   said tubular elements being positioned in butted alignment, and further including a resilient sealing ring (9) between the butted ends of the tubular elements;
   connecting attachment openings formed in the flange ring (4, 4') of each tubular element, and in axial alignment;
   and spring-loaded connecting bolts (10, 11) extending through said aligned openings, connecting the flange rings (4, 4') and securing together the flange rings (4, 4') secured to each one of the tubular elements (1, 1').

17. Flange connection according to claim 1, wherein the spring ring is a split ring.

18. Flange connection according to claim 17, wherein the spring ring is of essentially circular cross section.

19. Flange connection according to claim 1, wherein the spring ring is made of spring wire.

20. Flange connection according to claim 19, wherein the spring ring is of essentially circular cross section.

* * * * *